United States Patent [19]
O'Keefe

[11] Patent Number: 5,339,532
[45] Date of Patent: Aug. 23, 1994

[54] FISH LENGTH MEASURING DEVICE

[76] Inventor: John G. O'Keefe, 5823 Marview, Dallas, Tex. 75227

[21] Appl. No.: 38,290

[22] Filed: Mar. 29, 1993

[51] Int. Cl.$^5$ .............................................. G01B 5/02
[52] U.S. Cl. ........................................ 33/511; 33/485; 43/4
[58] Field of Search ................. 33/483, 484, 485, 511, 33/549, 562; 43/4, 54.1; 206/315.11, 0.8, 0.84

[56] References Cited

U.S. PATENT DOCUMENTS

| | | |
|---|---|---|
| 493,473 | 3/1893 | Borgström . |
| 1,474,804 | 11/1923 | Tyrrell . |
| 1,819,913 | 8/1931 | Miller et al. . |
| 2,185,359 | 4/1938 | Swanson . |
| 2,439,568 | 4/1948 | Hall . |
| 2,561,687 | 7/1951 | Craig . |
| 2,569,629 | 10/1951 | Everitt . |
| 2,624,502 | 1/1953 | Evans ........................ 206/315.11 X |
| 3,181,751 | 5/1965 | Wilson . |
| 3,259,988 | 7/1966 | Lunn . |
| 3,428,167 | 2/1969 | Sheng . |
| 4,143,765 | 3/1979 | Moss, III ....................... 206/0.84 X |
| 5,097,617 | 3/1992 | Craven . |
| 5,148,607 | 9/1992 | Lasiter ................... 33/549 |

FOREIGN PATENT DOCUMENTS 2410865  9/1975  Fed. Rep. of Germany ....... 206/0.8

Primary Examiner—William A. Cuchlinski, Jr.
Assistant Examiner—Alvin Wirthlin
Attorney, Agent, or Firm—David L. Mossman

[57] ABSTRACT

A fish measuring device is described which has a fish support surface with a length, width and first and second ends opposite one another. A stop at the first end prevents movement of a fish lengthwise beyond the first end and at least two fish restraining members at least partially along the length of the fish support surface partially enclose or envelope an interior space with the fish support surface. A passage exists between the two fish restraining members to permit a fishing line and/or thumb and forefinger holding a fish to be brought therethrough to the stop. A live fish may be brought into the device while still hooked via the line or after being unhooked. While the fish is restrained in its movement, its length may be compared against the end of the support surface or a scale therein to determine its length.

20 Claims, 2 Drawing Sheets

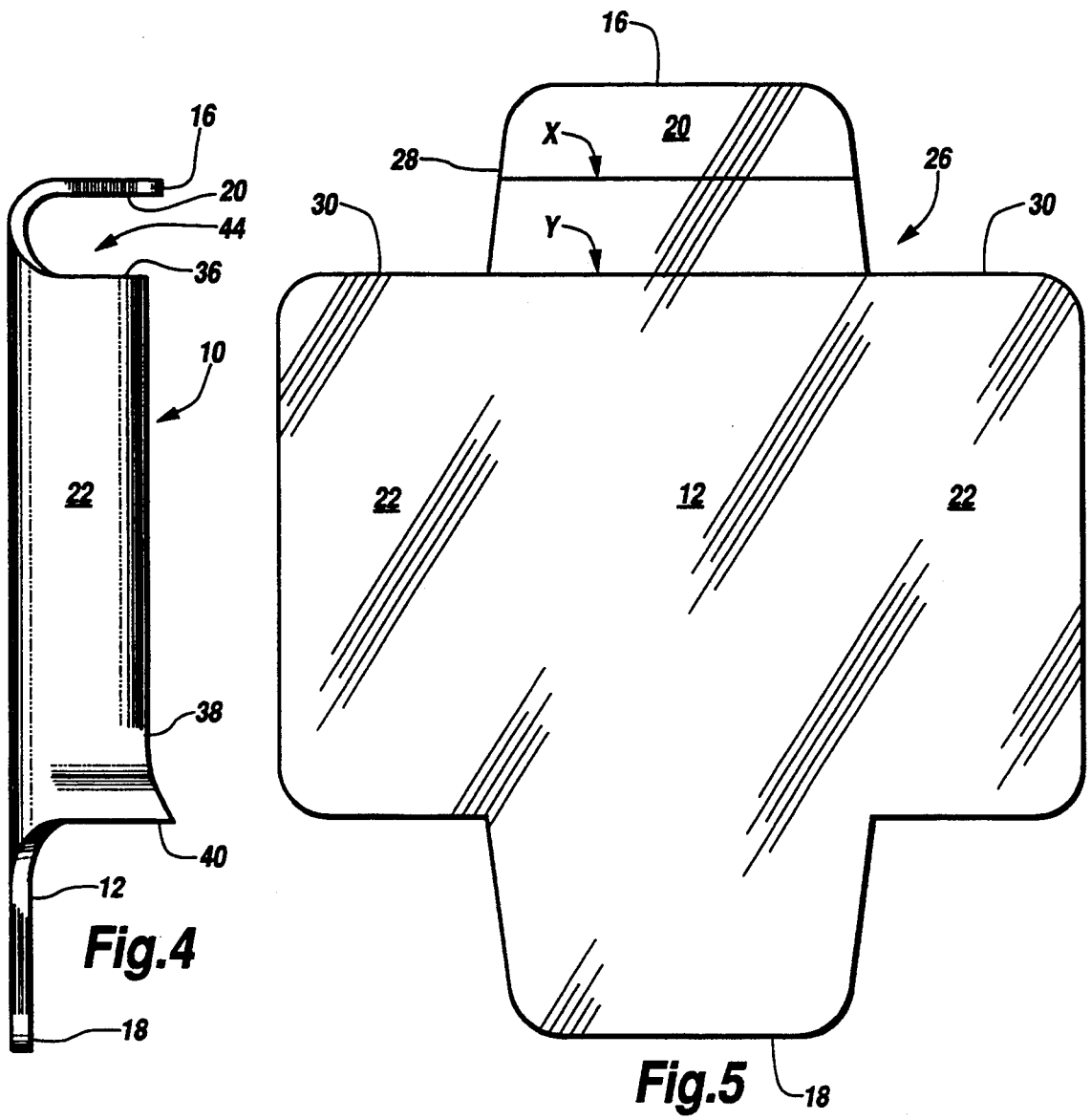
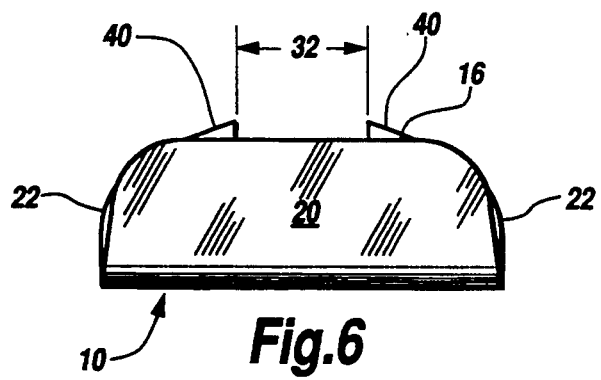

FISH LENGTH MEASURING DEVICE

FIELD OF THE INVENTION

The invention relates to devices for measuring the length of game fish while the fish remain alive, and particularly relates to portable, lightweight devices for restraining and measuring fish whether or not the fish are still on the hook.

BACKGROUND OF THE INVENTION

As is well known, the fish and game laws of the various states regulate the size of the fish which may be kept by the fisherman; requiring that all fish under the limit be released so that they may grow to at least the legal size. Fish size limits are a common means for conserving fish resources by preventing overdepletion of fish populations, and as such, fish size regulations are strictly and often severely enforced.

However, it has remained for the fishermen to determine a convenient and quick way to measure a live fish which does not cooperate with being caught and endeavors to escape, much less acquiesce to being measured. As has been well recognized, the use of a tape, ruler or yardstick type devices, while commonly available, are difficult to handle at the same time as a live fish. The fish typically will not remain still and extended for sufficient time to permit measurement and the fisherman is in danger of being stuck by the hook still within the fish. If the fish is unhooked to remove this hazard, then the fisherman is at risk of losing the fish during the cumbersome measuring operation.

A number of devices have been crafted to address these problems, For example, U.S. Pat. No. 1,474,804 discloses a fish measure having a body and a pair of shoulders spaced thereon at a predetermined distance. The shoulders readily provide a quick visual and tactile means of judging the size of the fish without having to read a scale, but there is not provided a way of restraining the movement of the live fish which assuredly will not lay straight upon the ruler-like stick.

A measuring device which is a hollow body formed of a moldable polystyrene, polypropylene, butyrate, etc. and open at one end is described in U.S. Pat. No. 3,259,988. At least one wall is transparent extending the full length of the enclosure and the fish can be judged as longer or shorter than the body for ready measurement. Measuring indicia may be present along the wall. This device appreciates and provides a mechanism for restraining the movement of the fish. However, in measuring the fish with this device one must unhook the fish first, which risks losing the fish, first while attempting to get it into the device and then again if it turns out the fish is of retainable size while attempting to get an unhooked fish onto a stringer or into a creel or live box. Additionally, since the length of the fish must usually be determined with its mouth closed, the fish's mouth can not be closed once it has been inserted into this hollow body.

U.S. Pat. No. 5,097,617 discloses an elongated, upwardly opening V-shaped trough for measuring fish. The trough has spaced apart indicia at measured intervals from one closed end of the trough for indicating the length of a fish placed in the trough. Auxiliary indicia are placed at appropriate distances along the trough to signify the legal limit for various species of fish likely to be encountered by a fisherman. While the use of labels such as "CRAPPIE" at 10", "BASS" at 13", "WALLEYE" at 15", etc. are easier to discern than memorizing the legal limits and then reading a numerical scale, a live fish will often not lie still in the V-shaped trough measuring. In attempting to restrain the fish being measured in such apparatus it is possible that it might be fatally injured and thus is wasted if it was undersized and cannot grow to the legal limit.

A device for simultaneously holding and measuring the length of a fish is also described in U.S. Pat. No. 5,148,607 which has a rectangular tray open at one end, the tray having a bottom, two side walls and one end wall and a preferably hinged lid with a releasable latch. The length of the tray is made equal to the minimum legal length established for the type of fish with which the device is to be used. The length of the lid is less than the length of the bottom of the tray and the lid is disposed on the tray with one end of the lid generally aligned with the closed end of the tray, such that a portion of the bottom of the tray adjacent to the open end is not covered by the lid. A fish is placed in the device with its nose against the end wall at the closed end of the tray, and the lid is closed to loosely retain the fish in the device. If the tail of the fish extends outwardly beyond the open end of the tray, the fish is of legal size and may be retained by the fisherman. While the inventor of this device appreciates the need for restraining the fish so that an accurate but quick measurement is obtained, the use of a tray with a hinged lid is again cumbersome. Despite descriptions that the apparatus can be easily used, it is readily seen that opening and closing the lid while inserting and removing the fish from the device risks injury to the fish. The use of a moving part (the hinge) also increases the possibility that the apparatus might break and additionally increases the cost of the device.

Both devices of U.S. Pat. Nos. 5,097,617 and 5,148,607 are also suffer from the relatively large and heavy and thus limited to boat use. People who prefer to wade fish, float fish or dock fish need a relatively small, lightweight, portable device that can be readily carried on one's person.

It would be desirable to discover a device for quickly, easily and accurately measuring the length of fish, whether hooked or not, and in such a way that the fish is restrained during measurement, but which simultaneously exposes the fish to a minimum risk of injury by reducing the amount of handling required.

SUMMARY OF THE INVENTION

Accordingly, it is an object of the present invention to provide a light-weight device for quickly and easily measuring a fish whether or not it is still on the hook.

It is another object of the present invention to provide a fish measuring device which restrains the movement of the fish while it is being measured so that an accurate measurement may be quickly obtained.

It is yet another object of the invention to provide a fish measuring device which has no moving parts, may be easily manufactured, is low in weight and is small and portable.

In carrying out these and other objects of the invention, there is provided, in one form, a fish measuring device having a fish support surface with a length and a first and second end. A stop exists at the first end to prevent movement of a fish beyond the first end. At least two fish restraining members are provided along the length of the fish support surface adapted to partially enclose an interior space with the fish support surface. Finally, a passage is present between the two fish restraining members to permit a fish to be brought into the interior space.

BRIEF DESCRIPTION OF THE DRAWINGS

FIG. 4 is a side view of the fish length measuring device;

FIG. 5 is a plan view of a thermoplastic or thermoset plastic pattern used to make the fish length measuring device of this invention; and FIG. 6 is an end view of the fish length measuring device showing the closed, first end thereof which serves as a stop.

It will be appreciated that some of the Figures are not to precise scale and that the device may be changed in the proportions of some features and still be within the scope of the invention.

DETAILED DESCRIPTION OF THE INVENTION

Figure 1:
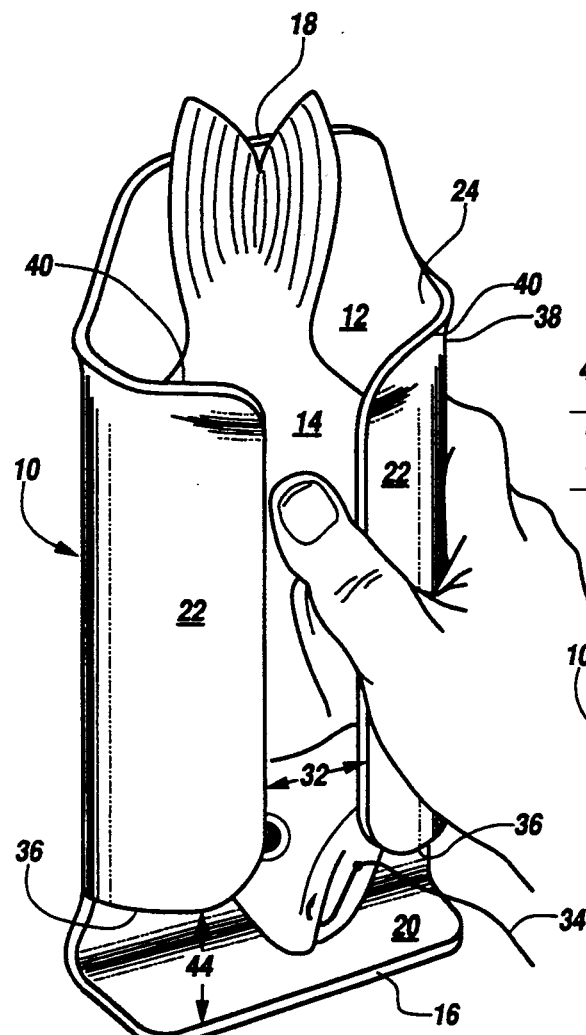
FIG. 1 is a three-quarters, perspective view of the fish length measuring device of the present invention showing it in use measuring a fish.

The invention will now be described in more detail with reference to the various Figures. FIG. 1 shows a fish length measuring device 10 of this invention having a fish support surface 12 which is shown throughout as flat although it may have a curved contour to further accommodate the shape of the fish 14 to be measured. The fish support surface 12 has a length L and a width W shown more clearly in FIG. 2, and a first end 16 and a second end 18. First end 16 may be bent at about a right angle to fish support surface 12 to form a stop 20 against which the nose of the fish is held. It is not critical that stop 20 be exactly at a right angle or 90° to fish support surface 12, for example, an angle of 45° 0 to the fish support surface 12 may be suitable. However, if the angle of stop 16 to support surface 12 was as much as 135° thereto, it might not effectively serve as a stop and thus an angle less than 135° is preferred. It will also be appreciated that stop 20 could be a separate piece from end 16 and not necessarily of one piece therewith. Neither should stop 20 necessarily be regarded as a flat surface, although this might be the most convenient shape to manufacture. It need only be of sufficient design to provide a bumper which contacts the nose of the fish 14 during measurement.

At least two fish restraining members 22 are provided at least partway along the length of the fish support surface 12 to partially enclose an interior space 24 together with the fish support surface 12. In one embodiment of the invention, the fish restraining members 22 have a length, M, which is at least half that of the length L of the fish support surface 12, to adequately limit the motion of the live fish 14. In one embodiment, the fish restraining members 22 have a length, M, which substantially matches that of surface 12, L. Fish support surface 12, fish restraining members 22 and stop 20 may be understood as an envelope for fish 14 which does not completely enclose it. Indeed, the fact that fish support surface 12, fish restraining members 22 and stop 20 do not meet and do not form a closed container provides many of the device 10's advantages.

In another embodiment, the fish length measuring device 10 is formed from a plastic sheet having a four-arm, generally cross-shaped pattern 26 as shown in FIG. 5. A first arm 28 may be folded at a generally right angle to form the stop 20, as described. Arms 30 on either side of and adjacent to the first arm 28 may be curved or folded in an arc toward each other and on the same side of the cross shape pattern 26 as the stop 20 to partially enclose interior space 24, and to become fish restraining members 22.

In their position on the fish length measuring device 10, fish restraining members 22 are separated by a passage 32. Passage 32 allows a fisherman to hold fish 14 by the mouth with his thumb and forefinger and bring the fish 14 into interior space 24 mouth first to stop 20; the passage 32 providing clearance for his fingers. Alternatively, passage 32 permits a fishing line 34 holding a fish 14 to be brought therethrough from the second end 18 to the first end 16 within the interior space 24 to the stop 20, as seen in FIG. 1. In one embodiment of the invention, the two fish restraining members 22 curve back upon the fish support surface 12 and approach each other, but do not meet, being separated by passage 32. It will be appreciated that the two fish restraining members 22 need not be curved or arcuate in shape, although this is a convenient form when they are formed from four-arm, generally cross-shaped pattern 26. They may be rectilinear and form a conventional box-like shape or cross-section. However, they must have the passage 32 between them.

Figure 2:
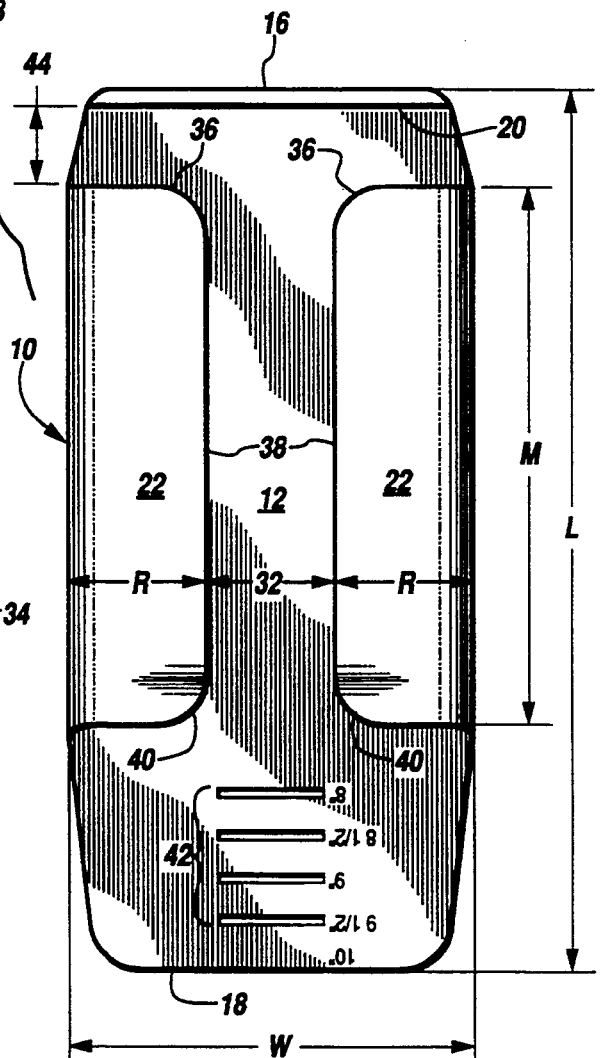
FIG. 2.is a top, plan view of the fish length measuring device of the present invention showing optional measuring indicia thereon.

Passage 32 should not have a width that is so narrow as to make it difficult to draw the fish 14 into the interior space 24 by means of the hook and line 34 or by hand. At the same time, passage 32 should not be so relatively wide (and, consequently, fish restraining members 22 so relatively narrow) that the fish 14 will escape the device 10. In one embodiment of the invention, it is recommended that the fish restraining members 22 extend about one-fourth to about one-third of the width W over the fish support surface 12. Referring to FIG. 2, in one form, R represents the width of the fish restraining members 22, and thus R is about 0.25 to 0.33 the amount of W. It will be understood that these proportions are estimates and are not critical. Indeed, R need not be the same proportion for each of the fish restraining members 22. Also, the term "about" is used which will be understood within the context of this application to mean ±15% of the values given above, meaning R may range from 0.21 to 0.38 times the value of W, at least in one embodiment.

The fish restraining members 22 may be understood to have first ends 36 near stop 20 and second ends 38 near second end 18 of fish support surface 12. The fish length measuring device 10 may also optionally have outwardly flared lips 40 on the second ends 38 of fish restraining members 22 near the second end 18 to more easily accept a fish 14 within the interior cavity 24. These flared lips 40 may be readily seen in FIGS. 1–4 and 6.

Also seen in FIGS. 1, 2 and 4 is optional finger clearance 44 between stop 20 and the first ends 36 of the fish restraining members 22. This clearance 44 permits one or more of the fisherman's fingers to have plenty of room to hold the fish 14's nose against stop 20 and/or to press line 34 also against stop 20 as seen in FIG. 1. While the device 10 could be used without clearance 44, in which case passage 32 would run directly to stop 20, the added space of clearance 44 more easily permits the fisherman to hold the fish 14 in proper position for the quick measurement. During manufacture of the fish length measuring device 10 from a single flat sheet of plastic material in a cross pattern 26 as seen in FIG. 5, folding up first end 16 at line Y would result in a stop 20 against or very close to the first ends 36 of fish restraining members 22 and finger clearance 44 would not exist or be too small to insert a finger and thus be ineffective. Folding first end 16 closer to the end, say at line X as shown in FIG. 5, would result in a stop 20 positioned approximately as seen in FIGS. 1, 2 and 4 and create the finger clearance 44. Beyond the necessity of inserting one or more fingers, there is no particular criteria for the dimension of clearance 44. In a non-limiting embodiment, this distance may range from 0.75 to 2", e.g.

FIG. 2 illustrates that measuring scale indicia 42 may be present on the fish support surface 12 near second end 18 to provide a more accurate measurement, if desired. It is apparent that the total length L of the fish length measuring device 10 can easily be made to an exact length so that the fisherman need only look to see if the fish tail extends beyond second end 18 to be of legal size; if shorter than second end 18, then the fish is undersized and must be released. While a quick visual indication, for different fish limits a different fish length measuring device 10 would be needed for each species. This is an acceptable alternative with the present device 10 which may be easily and cheaply made —and each device could even be color-coded or otherwise marked (such as with a picture or name) for the particular species. Alternatively a device could be sized for the largest common game fish, and the scale indicia 42 may be provided for shorter fish. The common critical fish limits may be prominently marked as in U.S. Pat. No. 5,097,617. The indicia distances could be denoted by raised or depressed marks for tactile detection. Indicia could even be impregnated with a phosphorescent material to permit night reading without the use of additional light, as suggested by U.S. Pat. No. 3,259,988.

Figure 3:
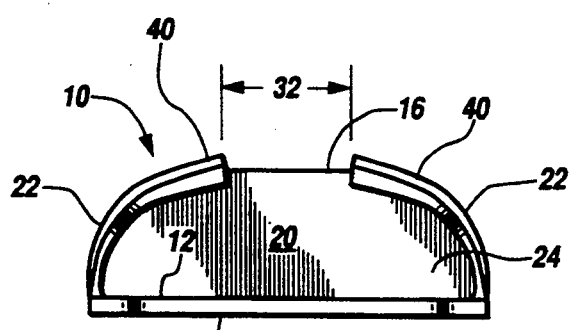
FIG. 3 is an end view of the fish length measuring device of this invention showing the open, second end thereof to permit the insertion of a fish to be measured.

FIG. 3 shows the fish length measuring device 10 from open, second end 18 viewing through the interior space 24 all the way to stop 20. If the device 10 was occupied by a fish, only the tail would be seen in this view. It will be appreciated that flared lips 40 present a larger opening than the cross section of the interior space 24 to permit entry of the fish 14 more readily. These flared lips 40 may also be seen in side view FIG. 4. As mentioned, the cross-sectional shape of interior space 24 may be rectangular, oval or a combination of the two.

The fish length measuring device 10 of the present invention may be made of any suitable material, including, but not limited to wood, metal, thermoplastic, thermoset plastic, etc. Polystyrene, polypropylene, butyrate, polyvinyl chloride (PVC) and other common, easily workable thermoplastics are preferred so the device 10 may be easily made from a flat, four-arm, generally cross-shaped pattern 26. The device 10 may be transparent or opaque. It is also readily apparent that it would be advantageous if it were made of a waterproof material since it will constantly be subject to water during the measuring. Manufacturing the device 10 from a material which floats such as closed cell or foamed plastics or wood is a desirable feature to avoid losing device 10 overboard.

It has been determined that expanded, closed cell PVC is particularly suitable as it is a thermoplastic easily cut and shaped, and is buoyant. Sintra ® PVC made by Alucobond Technologies Inc. is a brand of closed cell PVC.

In other embodiments of the invention, the device 10 may be die formed or injection molded of molten plastic for speed of production or reduced costs. Other conventional manufacturing methods may also be used.

Operation of the device is very simple, and notably easier than the prior art devices. Upon hooking a fish 14, the fisherman simply draws it into the interior space 24 of fish length measuring device 10 via line 34 or by thumb and forefinger in or on the mouth of the fish, by pulling it past second end 18 through second ends 38 (and flared lips 40, if present) between fish restraining members 22 and fish support surface 12 against stop 20. The device 10 may be oriented vertically or horizontally. The mouth of fish 14 is closed and pressed against stop 20, the fish tail is closed and the fisherman immediately turns up the device and notes if the fish's tail extends beyond second end 18 as shown in FIG. 1. The fisherman may press his thumb through passage 32 to further hold the fish still in position, as shown in FIG. 1. Movement of the fish 14 is restricted by restraining members 22 and gravity. If the critical length is met or exceeded, the fish is removed via the reverse direction, unhooked and secured on a stringer or in a creel or live box. If the fish 14 is too short, it is removed, unhooked (if necessary) and released. Another advantage of the device 10 is that the fish 14 can be put on a stringer while still in the device 10; through clearance 44.

Experimental models of device 10 have been tested by various fishermen and received enthusiastic acceptance. As noted, device 10 may be used in various ways. Novices tend to keep the fish 14 on line 34 during measurement to ensure they keep the fish. More accomplished fisherman unhook the fish immediately, especially if the mouth of the species is weak as in crappie, and can determine in a few seconds if they have a keeper.

Movement of the fish is restricted to permit ease in measuring. No moving parts are present to be fumbled with or to break. The device 10 may be readily and relatively inexpensively made from a flat, four-arm, generally cross-shaped pattern 26.

Many modifications may be made in the fish length measuring device of the invention without departing from the spirit and scope thereof which are defined in the accompanying claims. For example, the device could be provided with any number of mechanisms for securing it to boat or person, such as an eyelet for attachment via rope or belt; clips; snaps; loops; hook-and-fabric (Velcro ® fastener-type), etc. Because the device 10 is generally small and light-weight, it is ideal for wade fishing and float fishing where the gear must be easily portable. The device 10 can easily fit in pockets also. Further it would be apparent to make the second end 18 extendable, telescoping or retractable or otherwise be able to change the length of the fish support surface 12 temporarily so that different kinds of fish may be readily judged in length depending on which species is sought on a particular trip. Measuring scale indicia could also be provided on the fish restraining members 22 in addition to or in place of that on the fish support surface 12.

I claim:

1. A fish measuring device comprising:

a fish support surface having a widths, length and first and second ends;

a stop at the first end to prevent movement of a fish beyond the first end;

means for restraining a fish comprising at least two fish restraining members at least partially along the length of the fish support surface adapted to partially enclose an interior space with the fish support surface; and a passage means between the two fish restraining members for guiding a fish into the device while the fish is restrained by the fish restraining members.

2. The fish measuring device of claim 1 where the two fish restraining members curve back upon the fish support surface and approach each other, being separated by the passage.

3. The fish measuring device of claim 1 having a measuring scale indicia along an element selected from the group of elements consisting of the fish support surface and one or both of the fish restraining members.

4. The fish measuring device of claim 1 which was formed from a plastic sheet having a four-arm, generally cross-shaped pattern; one first arm being folded at a generally right angle to the cross-shaped pattern to form the stop and the arms on either side of the first arm being folded in an arc toward each other and on the same side of the cross-shaped pattern as the first arm to at least partially enclose the interior space with a center portion of the pattern between the arms, the arms on either side forming the two fish restraining members.

5. The fish measuring device of claim 1 where the fish restraining members have first ends near the stop and second ends away from the stop, the second ends being flared away from the fish support surface.

6. The fish measuring device of claim 1 made of a material which floats on water.

7. The fish measuring device of claim 1 where the fish restraining members have a length at least half that of the fish support surface.

8. The fish measuring device of claim 1 where the fish support surface has a width and the fish restraining members extend from about one fourth to about one third of the width over the fish support surface.

9. The fish measuring device of claim 1 where the fish restraining members have first ends near the stop and second ends away from the stop, the fish measuring device having a clearance between the stop and at least one of the first ends of the fish restraining members.

10. A fish measuring device comprising:
a fish support surface having a width, length and first and second ends;
a stop at the first end to prevent movement of a fish beyond the first end;
means for restraining a fish comprising at least two fish restraining members at least partially along the length of the fish support surface adapted to partially enclose an interior space with the fish support surface, where the fish restraining members have a length at least half that of the fish support surface, and where the fish restraining members extend from about one fourth to about one third over the width of the fish support surface; and
a passage means between the two fish restraining members for guiding a fish into the device while the fish is restrained by the fish restraining member.

11. The fish measuring device of claim 10 where the two fish restraining members curve back upon the fish support surface and approach each other, being separated by the passage.

12. The fish measuring device of claim 10 having a measuring scale indicia along an element selected from the group of elements consisting of the fish support surface and one or both of the fish restraining members.

13. The fish measuring device of claim 10 which was formed from a plastic sheet having a four-arm, generally cross-shaped pattern; one first arm being folded at a generally right angle to the cross-shaped pattern to form the stop and the arms on either side of the first arm being folded in an arc toward each other and on the same side of the cross-shaped pattern as the first arm to at least partially enclose the interior space with a center portion of the pattern between the arms, the arms on either side forming the two fish restraining members.

14. The fish measuring device of claim 10 where the fish restraining members have first ends near the stop and second ends away from the stop, the second ends being flared away from the fish support surface.

15. The fish measuring device of claim 10 made of a material which floats on water.

16. The fish measuring device of claim 10 where the fish restraining members have first ends near the stop and second ends away from the stop, the fish measuring device having a clearance between the stop and at least one of the first ends of the fish restraining members.

17. A fish measuring device comprising:
a fish support surface having a width, length and first and second ends;
a stop at the first end to prevent movement of a fish beyond the first end;
means for restraining a fish comprising at least two fish restraining members at least partially along the length of the fish support surface adapted to partially enclose an interior space with the fish support surface,
where the fish restraining members have a length at least half that of the fish support surface,
where the fish restraining members extend from about one fourth to about one third over the width of the fish support surface and
where the fish restraining members have first ends near the stop and second ends away from the stop, the second ends being flared away from the fish support surface;
a passage means between the two fish restraining members for guiding a fish into the device while the fish is restrained by the fish restraining members; and
a clearance between the stop and at least one of the first ends of the fish restraining members.

18. The fish measuring device of claim 17 where the two fish restraining members curve back upon the fish support surface and approach each other, being separated by the passage.

19. The fish measuring device of claim 17 which was formed from a plastic sheet having a four-arm, generally cross-shaped pattern; one first arm being folded at a generally right angle to the cross-shaped pattern to form the stop and the arms on either side of the first arm being folded in an arc toward each other and on the same side of the cross-shaped pattern as the first arm to at least partially enclose the interior space with a center portion of the pattern between the arms, the arms on either side forming the two fish restraining members.

20. The fish measuring device of claim 17 made of a material which floats on water.

* * * * *